US010135527B1

(12) United States Patent
Csonka et al.

(10) Patent No.: US 10,135,527 B1
(45) Date of Patent: Nov. 20, 2018

(54) METHOD OF COMMUNICATION LINK ACQUISITION USING SEARCH PATTERN

(71) Applicant: X Development LLC, Mountain View, CA (US)

(72) Inventors: Paul Csonka, Redwood City, CA (US); Edward Keyes, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/486,617

(22) Filed: Apr. 13, 2017

Related U.S. Application Data

(60) Provisional application No. 62/438,164, filed on Dec. 22, 2016.

(51) Int. Cl.
*H04B 10/27* (2013.01)
*H04B 10/11* (2013.01)

(52) U.S. Cl.
CPC ............ *H04B 10/11* (2013.01); *H04B 10/27* (2013.01)

(58) Field of Classification Search
CPC ................................ H04B 10/11; H04B 10/27
See application file for complete search history.

(56) References Cited

U.S. PATENT DOCUMENTS

| 4,696,053 | A | 9/1987 | Mastriani et al. | |
|---|---|---|---|---|
| 9,264,137 | B2 | 2/2016 | Saint Georges | |
| 2004/0141753 | A1* | 7/2004 | Andreu-von Euw | H04B 10/1127 398/122 |
| 2006/0018663 | A1 | 1/2006 | Moursund et al. | |
| 2012/0308239 | A1* | 12/2012 | Sheth | H04B 10/1125 398/131 |
| 2013/0315604 | A1* | 11/2013 | LoPresti | H04B 10/1123 398/116 |
| 2014/0241731 | A1* | 8/2014 | Peach | H04B 10/1127 398/128 |
| 2015/0002840 | A1* | 1/2015 | Pettersson | G03H 1/0005 356/152.1 |

OTHER PUBLICATIONS

Khan et al., "Maintaining a Free-Space-Optical Communication Link Between Two Autonomous Mobiles", IEEE Wireless Communications and Networking Conference (WCNC), Apr. 6, 2014, pp. 3154-3159.

* cited by examiner

*Primary Examiner* — Dzung Tran
(74) *Attorney, Agent, or Firm* — Lerner, David, Littenberg, Krumholz & Mentlik, LLP

(57) ABSTRACT

Aspects of the disclosure provide for a method of forming a communication link between two communication devices using a primary search pattern and a secondary search pattern. A misalignment between a first optical system of a first communication device and a second optical system of a second communication device is detected. The first optical system is rotated according to the primary search pattern, and the second optical system according to the secondary search pattern. At the second communication device, a set of frames is captured. Then, it is determined whether a beacon beam transmitted from the first communication device is detected in the one or more of the captured frames. When it is determined that the beacon beam is detected, the communication link is formed between the first communication device and the second communication device.

20 Claims, 10 Drawing Sheets

700

METHOD OF COMMUNICATION LINK ACQUISITION USING SEARCH PATTERN

CROSS-REFERENCE TO RELATED APPLICATIONS

The present application claims the benefit of the filing date of U.S. Provisional Patent Application No. 62/438,164 filed Dec. 22, 2016, the disclosure of which is hereby incorporated herein by reference.

BACKGROUND

Communication terminals may transmit and receive optical signals through free space optical links. In order to accomplish this, such terminals generally use acquisition and tracking systems to establish the optical link by pointing optical beams towards one another. For instance, a transmitting terminal may use a beacon laser to illuminate a receiving terminal, while the receiving terminal may use a position sensor to locate the transmitting terminal and to monitor the beacon laser. Steering mechanisms may maneuver the terminals to point toward each other and to track the pointing once acquisition is established. A high degree of pointing accuracy may be required to ensure that the optical signal will be correctly received.

BRIEF SUMMARY

Aspects of the disclosure provide for a method. The method includes detecting, by one or more processors, a misalignment between a first optical system of a first communication device and a second optical system of a second communication device; rotating, by the one or more processors, the first optical system according to a primary search pattern and the second optical system according to a secondary search pattern, the primary search pattern including keeping the first optical system fixed for a set amount of time, and the secondary search pattern comprising a series of positions ordered in increasing distance from a starting position; capturing, by the one or more processors, a set of frames at the second communication device; determining, by the one or more processors, whether a beacon beam transmitted from the first communication device is detected in one or more of the captured frames at the second communication device; and forming, by the one or more processors, a communication link between the first communication device and the second communication device when the beacon beam is detected.

In one example, the set amount of time that the first optical system is fixed is a length of time that the secondary search pattern takes to complete one cycle. In another example, the primary search pattern is a series of positions forming concentric circles centered on the starting beacon position of the primary device.

In yet another example, the method also includes designating, by the one or more processors, the first communication device as a primary device associated with the primary search pattern and the second communication device as a secondary device associated with the secondary search pattern. In this example, the method also includes swapping, by the one or more processors, the designations of the first communication device and the second communication device when the beacon beam is not detected after the primary search pattern and the secondary search pattern are both completed; and rotating, by the one or more processors, the first optical system according to the secondary search pattern and the second optical system according to the primary search pattern. Also in this example, the method also includes designating, by the one or more processors, the first communication device and the second communication device both as secondary devices when the beacon beam is not detected after the primary search pattern and the secondary search pattern are both completed; and rotating, by the one or more processors, the first optical system and the second optical system according to the secondary search pattern.

In a further example, determining whether the beacon beam transmitted from the first communication device is detected in one or more of the captured frames at the second communication device includes determining a level of confidence that the beacon beam is detected, determining whether the level of confidence exceed a threshold level of confidence, determining that the beacon beam is detected when the level of confidence meets the threshold level of confidence, and determining that the beacon beam is not detected when the level of confidence is less than the threshold level of confidence. In another example, the method also includes digitally cropping, by the one or more processors, a frame of the second communication device after the beacon beam is detected, the digitally cropped frame including a pixel region where the beacon beam is detected in the frame. In this example, the method also includes determining, by the one or more processors, that the communication link is lost; continually enlarging, by the one or more processors, the digitally cropped frame to include a larger pixel region until the beacon beam is detected in the digitally cropped frame; and reforming, by the one or more processors, the communication link. Further in this example, the method also includes initiating, by the one or more processors, the primary search pattern and the secondary search pattern when the digitally cropped frame is enlarged greater than a maximum threshold size.

Other aspects of the disclosure provide for a system. The system includes a first communication device comprising a first optical system, a second communication device comprising a second optical system, and one or more processors. The one or more processors are configured to detect a misalignment between the first optical system and the second optical system; rotate the first optical system according to a primary search pattern and the second optical system according to a secondary search pattern, the primary search pattern including keeping the first optical system fixed for a set amount of time, and the secondary search pattern comprising a series of positions ordered in increasing distance from a starting position; capture a set of frames at the second communication device; determine whether a beacon beam transmitted from the first communication device is detected in one or more of the captured frames at the second communication device; and form a communication link between the first communication device and the second communication device when the beacon beam is detected.

In one example, the set amount of time that the first optical system is fixed is a length of time that the secondary search pattern takes to complete one cycle. In another example, the primary search pattern is a series of positions forming concentric circles centered on the starting beacon position of the primary device.

In yet another example, the one or more processors are also configured to designate the first communication device as a primary device associated with the primary search pattern and the second communication device as a secondary device associated with the secondary search pattern. In this example, the one or more processors are also configured to swap the designations of the first communication device and the second communication device when the beacon beam is not detected after the primary search pattern and the secondary search pattern are both completed; and rotate the first optical system according to the secondary search pattern and the second optical system according to the primary search pattern. Also in this example, the one or more processors are also configured to designate the first communication device and the second communication device both as secondary devices when the beacon beam is not detected after the primary search pattern and the secondary search pattern are both completed; and rotate the first optical system and the second optical system according to the secondary search pattern.

In a further example, determining whether the beacon beam transmitted from the first communication device is detected in one or more of the captured frames at the second communication device includes determining a level of confidence that the beacon beam is detected, determining whether the level of confidence exceed a threshold level of confidence, determining that the beacon beam is detected when the level of confidence meets the threshold level of confidence, and determining that the beacon beam is not detected when the level of confidence is less than the threshold level of confidence. In another example, the one or more processors are also configured to digitally crop a frame of the second communication device after the beacon beam is detected, the digitally cropped frame including a pixel region where the beacon beam is detected in the frame; determine that the communication link is lost; continually enlarge the digitally cropped frame to include a larger pixel region until the beacon beam is detected in the digitally cropped frame; and reform the communication link. In this example, the one or more processors are also configured to initiate the primary search pattern and the secondary search pattern when the digitally cropped frame is enlarged greater than a maximum threshold size.

Further aspects of the disclosure provide for a non-transitory, tangible computer-readable storage medium on which computer readable instructions of a program are stored. The instructions, when executed by one or more computing devices, cause the one or more computing devices to perform a method. The method includes detecting a misalignment between a first optical system of a first communication device and a second optical system of a second communication device; rotating the first optical system according to a primary search pattern and the second optical system according to a secondary search pattern, the primary search pattern including keeping the first optical system fixed for a set amount of time, and the secondary search pattern comprising a series of positions ordered in increasing distance from a starting position; capturing a set of frames at the second communication device; determining whether a beacon beam transmitted from the first communication device is detected in one or more of the captured frames at the second communication device; and forming a communication link between the first communication device and the second communication device when the beacon beam is detected.

DETAILED DESCRIPTION

Overview

Figure 1:
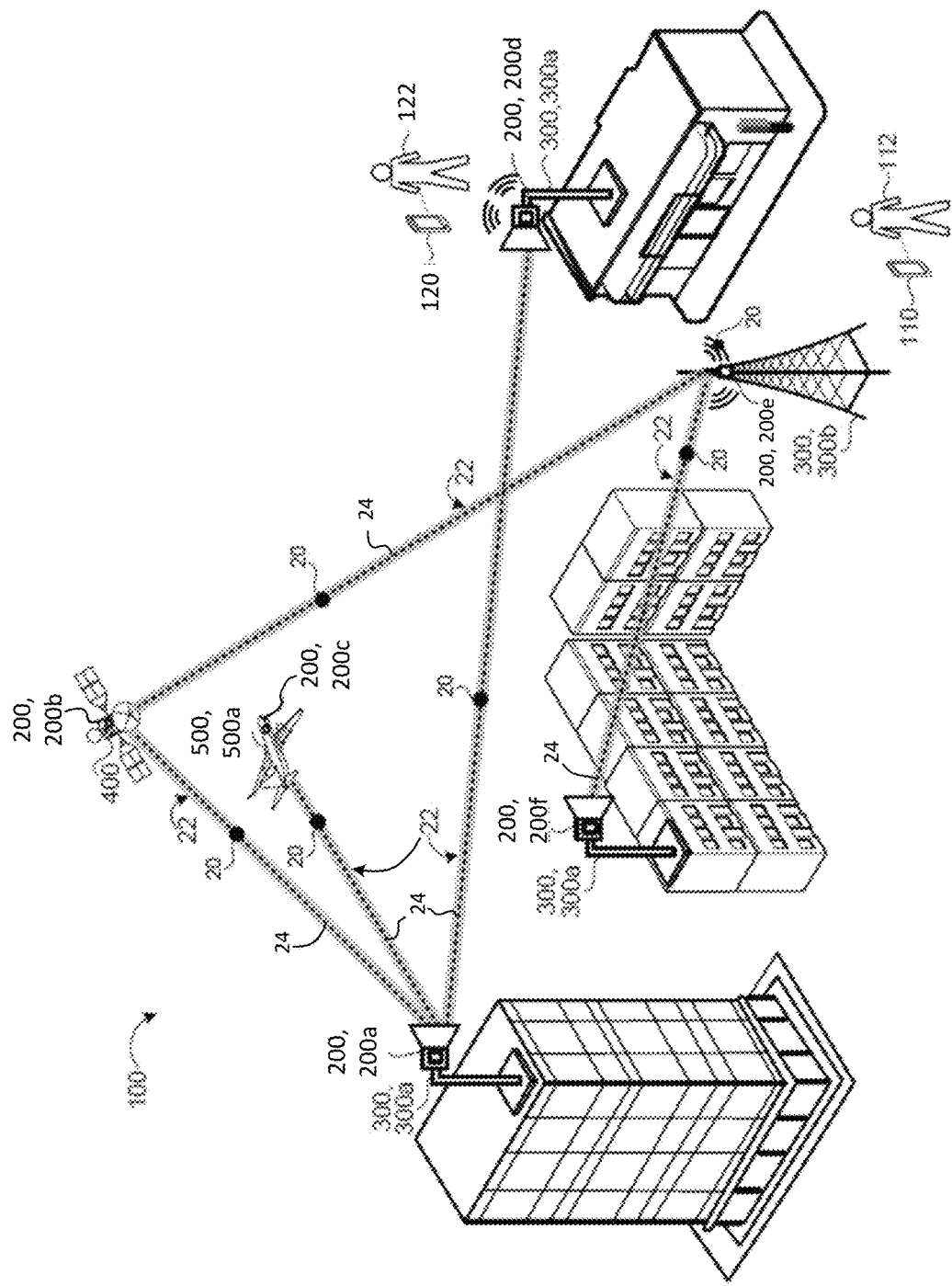
FIG. 1 is a pictorial diagram of an example communication network in accordance with aspects of the disclosure.

The technology relates to the search and acquisition of a communication link. A search is necessary when two communication devices are not properly oriented or aligned towards one another. In such cases, the communication devices may be unable to communicate with one another, and thus, a search is needed to identify the correct alignment so that the communication devices are able to establish a communication link.

When it is detected that a first optical system of a first communication device and a second optical system of a second communication device are not properly aligned, for instance because they are not able to communicate, one communication device (for instance the first communication device may be designated the primary device, and another communication device (for instance, the second communication device) may be designated as the secondary device, or vice versa. The designation may be based on a calibration of the optical system of each communication device.

While the primary device transmits a beacon beam and remains pointed in an estimated direction of the secondary device, the secondary device may rotate based on a secondary search pattern comprising a series of positions forming an outward spiral from a set position. When the secondary device detects the beacon beam from the primary device, no further rotation is performed by the secondary device.

When the secondary device does not detect the beacon beam from the primary device after rotating to the whole series of positions of the secondary search pattern, the primary device may rotate to different positions in a primary search pattern forming concentric circles. Initially, the circles start with smaller radii and are incrementally expanded to circles with larger radii. For each position of the primary search pattern, the secondary device may repeat the secondary search pattern until the secondary device detects the beacon beam from the primary device.

When the secondary device detects the beacon beam from the primary device, the secondary device is adjusted to focus on the beacon beam. A communication link is then established, and communications and data are transmitted and received between the two communication devices.

Example Systems

A communication network may include optical communication links used to transfer data between communication devices. The communication devices may be positioned on buildings, on the ground, or on moving devices (e.g., gimbal devices arranged on high-altitude platforms or satellites). As such, the communication links are used to transfer the data between the buildings, the ground, and the moving devices. Each optical link allows for communication between two communication devices. A transmitting communication device is configured to transmit an optical beam, while a receiving communication device is configured to detect the optical beam from the transmitting communication device and thus form the communication link. Of course, communication devices may be one or both transmitting and receiving communication devices at any given point in time.

Referring to FIG. 1, a global-scale communication network 100 includes a variety of communication devices 200, e.g., 200a, 200b, 200c, 200d, 200e, and 200f, associated with communication terminals such as, for example, stationary communication terminals 300, satellites 400, and high-altitude platforms (HAP) 500, such as an airplane 500a. The communication devices 200a-f may communicate directly or indirectly with one another. The stationary communication terminals 300 may be building stationary terminals 300a located on the rooftop of buildings or ground stationary terminal 300b located on the ground. The stationary communication terminals 300 may receive a communication signal 20 from another stationary terminal 300, a satellite 400, or a HAP 500, and reroute the communication signal 20 to another stationary terminal 300, a satellite 400, or a HAP 500, or in some examples, to one or more user devices 110, 120, each of which may be associated with a user 112, 122. The satellite 400 may be in Low Earth Orbit (LEO), Medium Earth Orbit (MEO), or High Earth Orbit (HEO), including Geosynchronous Earth Orbit (GEO). The network 100 may also include HAPs 500 that operate at high altitudes (e.g., 17-22 km). For instance, HAPs 500 may be released into the earth's atmosphere, e.g., by an air craft, or flown to the desired altitude.

The global-scale communication network 100 uses free-space optical communications (FSOC), which is an optical communication technology that uses light propagating in free space to wirelessly transmit data. Therefore, the global-scale communication network 100 transmits a communication signal 20 wirelessly between two communication terminals 300, 400, 500.

A communication device 200 is included in each of the stationary communication terminals 300, the satellites 400, and the HAPs 500 that use FSOC. The communication devices 200a-f may be configured to establish an optical communication link 22 between two communication terminals 300, 400, 500 allowing a communication signal 20 to be transmitted from one communication terminal 300, 400, 500 to another. Once a communication link 22 is established between two communication devices 200, then a transmitting communication device, such as 200a, may transmit a communication signal 20 to a receiving communication device, such as 200b. In some examples, when a transmitting communication device, such as 200a, transmits a communication beam to establish a communication link 22 with a receiving communication device, such as 200b, it is desirable that the transmitting communication device 200a accurately transmits the communication beam so that the receiving communication device 200b accurately receives the communication beam. In some implementations, because of the distances between the communication devices 200a, 200b, a 0.001-degree accuracy may be needed to correctly establish the communication link 22.

As further illustrated in FIG. 1, a beacon beam 24 (dotted line) may be transmitted from the transmitting communication device 200 to establish the communication link 22 with the receiving communication device 200. Specifically, communication device 200a may be a transmitting communication device, and communication device 200b, 200c, or 200d may be a receiving communication device, and vice versa. In addition, communication device 200b may be a transmitting communication device, and communication device 200e a receiving communication device, and vice versa. Communication device 200e may also be a transmitting communication device, and communication device 200f a receiving communication device, and vice versa. The beacon beam 24 may illuminate a larger solid angle in space than the optical beam used in the communication link 22, allowing the second communication device 200 to better locate the beacon beam 24. The first communication device 200 may align the beacon beam 24 co-linearly with the optical communication beam (not shown) that has a narrower angle than the beacon beam 24 and carries the communication signal 20. As such, when the receiving communication device 200 receives the beacon beam 24, the receiving communication device 200 may close a communication loop establishing a line-of-sight with the transmitting communication device 200. As a result, the communication link 22 that allows for the transmission of the optical communication beam (not shown) is established.

Figure 2:
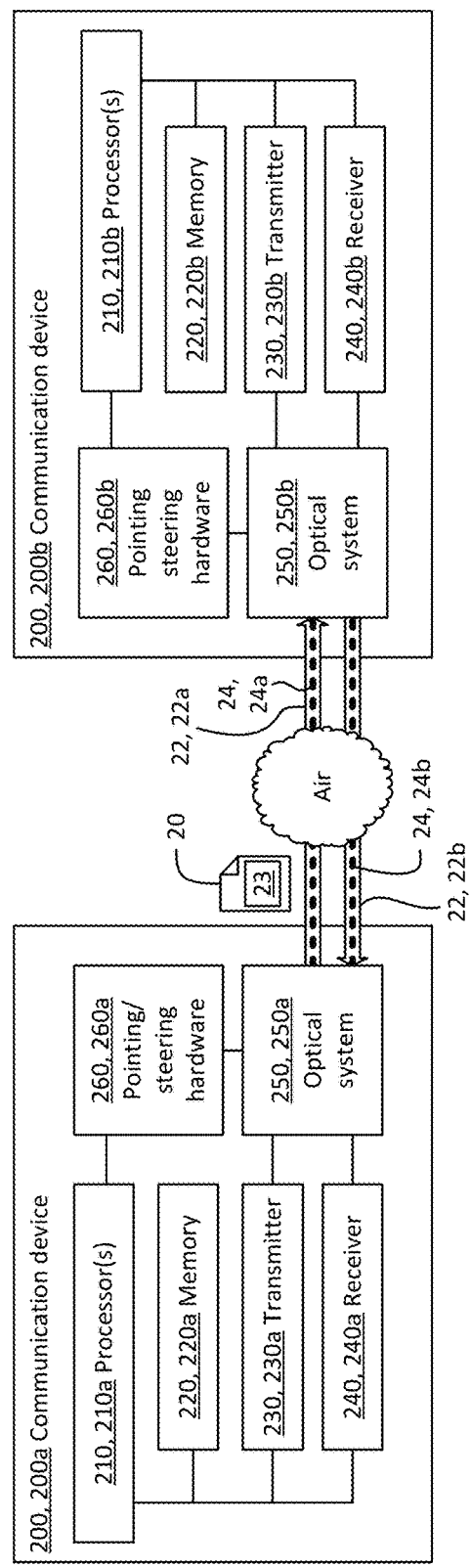
FIG. 2 is a functional diagram of an example communication system in accordance with aspects of the disclosure.

Referring to FIG. 2, in some implementations, the communication network 100 provides a communication signal 20 between two communication devices 200, e.g., a first communication device 200a and a second communication device 200b through a free space optical link 22. The communication signal 20 may include data 23, such as, for example, internet protocol packets, being routed through the global-scale communication network 100. Each communication device 200, 200a, 200b may include one or more processors 210, e.g., 210a or 210b, a memory 220, e.g., 220a or 220b, a transmitter 230, e.g., 230a or 230b, a receiver 240, e.g., 240a or 240b, an optical system 250, e.g., 250a or 250b, and pointing hardware 260, or steering hardware, e.g., 260a or 260b. Communication devices 200c-f may also be configured with the same elements.

The one or more processors 210 is operatively coupled with memory 220 that stores information, such as, for example, instructions executable by the one or more processors 210, non-transitorily at the one or more processors 210. Information about the calibration of the first communication device 200a may be updated and stored at regular intervals in the memory 220a of the first communication device 200a. In addition, information about the calibration of the second communication device 200b may be transmitted to and stored in the memory 220a of the first communication device 200a at regular intervals. Information about the first and second communication devices 200a, 200b may also be stored at regular intervals in the memory 220b of the second communication device 200b. The stored information may include, for example, an updated location, a time of a last location update, a time of last detection of the other communication device, a level of confidence of being in the same location as the last location update, a location of a received beacon, and/or a level of confidence of a location of a last received beacon.

The one or more processors 210 may also be in communication with the transmitter 230 and the receiver 240. The one or more processors 210 may therefore be configured to transmit, via the transmitter 230, communications and data 23 in the form of optical beams, and also may be configured to receive, via the receiver 240, communications and data 23 in the form of optical beams. Received optical beams may be processed by the one or more processors 210 to extract the communications and data 23.

The one or more processors 210 may further be configured to determine a position error of an optical system 250 indicative of a misalignment of an optical beam transmitted between two optical systems 250. A first optical system 250a of the first communication device 200a and a second optical system 250b associated with the second communication device 200b. As such, the one or more processors 210 may determine an adjusted position of the first optical system 250a and/or the second optical system 250b to establish a link 22a and/or 22b. Furthermore, the one or more processors 210 may be associated with the pointing hardware 260 (e.g., a gimbal) for adjusting the optical system 250, and may be configured to provide pointing adjustments of the optical system 250. The pointing hardware 260 may be configured to move in at least two degrees of freedom, such as, for example, yaw and pitch. The adjustments to the optical system 250a and/or the optical system 250b may be made to establish acquisition and connection link between the first communication device 200a and the second communication device 200b. In some implementations, the one or more processors 210 may provide closed loop control for the optical system 250 to adjust optical beam pointing based on the receiver 240 at the receiving communication device based upon the signal strength for an optical beam received over the communication link 22 from the transmitting communication device.

The transmitter 230 may be a semi-conductor device, such as, for example, a light-emitting diode (LED) or a laser diode. In some examples, the transmitter 230 may be a fiber laser or a solid state laser. Laser diodes may be directly modulated, or in other words, the light output may be controlled by a current applied directly to the transmitter 230. The transmitter 230 may be a single-mode laser diode that supports one optical mode, or the transmitter 230 may be a multimode laser diode that supports multiple-transverse optical modes. The transmitter 230 may receive a modulated communication signal 20 from a modulator (not shown), which in turn receives an electrical signal, and modulates the electrical signal. The transmitter 230 may receive the modulated electrical signal, convert the electrical signal into an optical communication beam, and output the optical communication beam into an optical fiber towards the optical system 250. The transmitter 230 is also configured to output a beacon beam 24 that allows one communication device to locate another. For example, transmitter 230a of the first communication device 200a may output a beacon beam 24a to locate the second communication device 200b and establish a communication link 22a with the second communication device 200b. The transmitter 230b of the second communication device 200b may similarly output a beacon beam 24b to locate and establish a communication link 22b with the first communication device 200a. As such, the communication link 22a, 22b may allow for communication signal 20 between the two communication devices 200a and 200b.

The receiver 240 includes a light position sensing device to detect the optical beam 210. In some examples, the light position sensing device includes, but is not limited to, a lateral position device, a charge-coupled Device (CCD) camera, a photodetector, a quad-cell, or a CMOS sensor to detect the optical beacon laser. The receiver 240 converts the received optical beam 210 into an electric signal using the photoelectric effect.

The optical system 250 may be configured to transmit the optical beams, such as, for example, optical communication beam (not shown) or beacon beam 24, as well as receive the optical beams and provide the received optical beams to the receiver 240. For receiving optical beams, the optical system 250 and/or the receiver 240 may include, but are not limited to, a de-multiplexer, an optical pre-amplifier, photodiodes, the photo receiver, transimpedance amplifiers, clock/phase recovery circuits, decision circuits, and/or forward error correction circuits. The optical system 250 and the receiver 240 may be configured to acquire image frames, and the receiver 240 may further be configured to process the acquired image frames to determine a location of the received optical beams.

Configurations of the optical system 250 may include transmitter optics that are separate from receiver optics. As such, communication link 22a may be formed between transmitter optics of one communication device and receiver optics of another communication device. For example, the first communication device 200a may form a communication link 22a with the second communication device 200b using transmitter optics in optical system 250a of the first communication device 200a and receiver optics in optical system 250b of the second communication device 200b. The transmitter optics in optical system 250a at the first communication device 200a may transmit a beacon beam 24a, which the receiver optics in optical system 250b at the second communication device 200b locates and identifies to form a communication link 22a. Once the communication link 22a is formed, the one or more processors 210a can send communications 20 to the second communication device 200b. Similarly, the transmitter optics in optical system 250b at the second communication device 200b may transmit an optical beacon beam 24b, which the receiver optics in optics system 250a at the first communication device 200a locates and identifies to form a communication link 22b. Once the communication link 22b is formed, the one or more processors 210b can send communication signals 20 to the first communication device 200a. In some examples, it is sufficient to establish one communication link 22 between the first and second communication devices 220a, 220b, via the optical systems 250a and 250b, which allows for the bi-directional transmission of data 23 between both devices 200a, 200b.

Figure 3A:
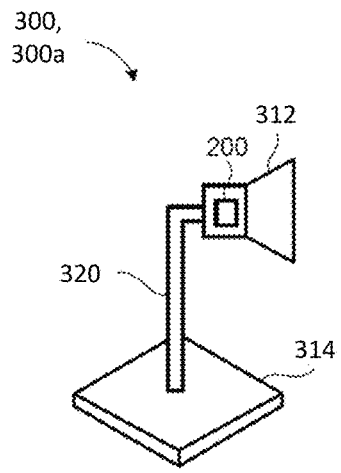
FIGS. 3A and 3B are pictorial diagrams of example stationary communication terminals in accordance with aspects of the disclosure.
Figure 3B:
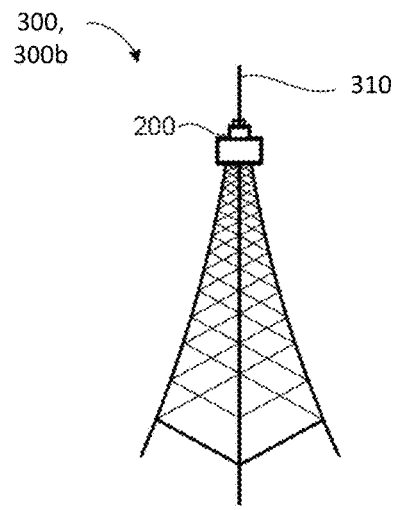

Referring to FIGS. 3A and 3B, in some implementations the communication terminal 300 includes one of the communication devices 200 that receives the communication signal 20 from another communication terminal 300, a satellite 400, or a HAP 500 and transmits the communication signal 20 to a further communication terminal 300, satellite 400, or HAP 500. FIG. 3A illustrates an example building stationary terminal 300a that includes a base 314 and a reflector 312 supported by the base 314 via support member 320. The building stationary terminal 300a also includes one of the communication devices 200, and one or more processors 210 (as described above) in communication with the communication device 200. The base 314 may mount the building stationary terminal 300a on a building. FIG. 3B illustrates an example ground stationary terminal 300b that also includes an antenna 310, a communication device 200, and one or more processors 210. In some implementations, two stationary communication terminals 300 may establish acquisition and tracking with one another without using position sensors, fast steering mirrors, and/or fast gimbals that are employed by sophisticated acquisition and tracking systems required by communication terminals that move fast and relative to one another.

Figure 4:
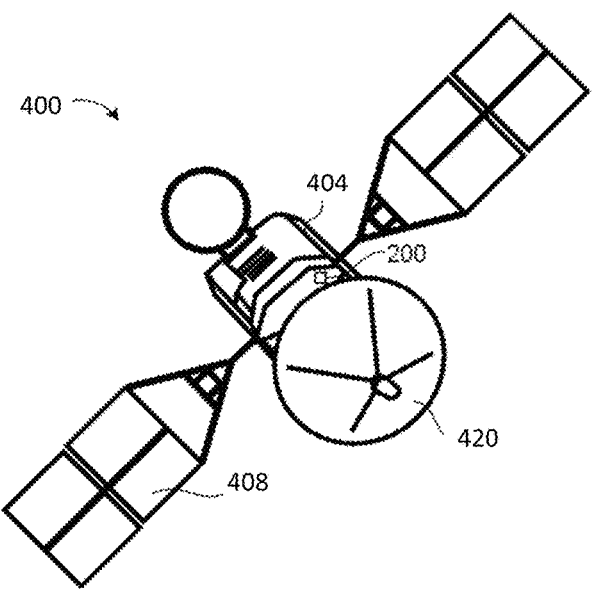
FIG. 4 is a pictorial diagram of an example satellite in accordance with aspects of the disclosure.

Referring to FIG. 4, satellite 400 may be an object placed into orbit around the earth and may serve different purposes, such as, for example, military or civilian observation satellites, communication satellites, navigation satellites, weather satellites, and research satellites. The orbit of the satellite 400 varies depending in part on the purpose of the satellite 400. Satellite orbits may be classified based on their altitude from the surface of the Earth as Low Earth Orbit (LEO), Medium Earth Orbit (MEO), and High Earth Orbit (HEO). Geosynchronous Earth Orbit (GEO) is a special case of HEO. Geostationary Earth Orbit (GSO, although sometimes also called GEO) is a special case of Geosynchronous Earth Orbit. Satellites 400 placed in the GEO orbit can "stand still" with respect to a certain location on earth. Thus, a person on earth looking at a satellite 400 in the GEO orbit would perceive that the satellite 400 is not moving. Therefore, the satellites 400 in GEO orbit maintain a position with respect to a location on earth. Thus, a stationary terminal 300 communicating with a satellite 400 in the GEO orbit does not need to keep tracking the satellite 400 as the satellite 400 moves, the stationary terminal 300 only needs to point to a direction of the satellite 400 in its stationary position with respect to the stationary terminal 300.

In some implementations, the satellite 400 includes a satellite body 404 having a payload that includes one of the communication devices 200. The satellite 400 may also include solar panels 408 mounted on the satellite body 404 for providing power to the satellite 400. In some examples, the satellite 400 may include rechargeable batteries used when sunlight is not reaching and charging the solar panels 408. The satellite 400 may include an antenna 420 for receiving and transmitting the communication signal 20 as well as a reaction control system (RCS) that uses thrusters to adjust the altitude and translation of the satellite 400 making sure that the satellite 400 stays in its orbit. The RCS may provide small amounts of thrusts in one or more directions and torque to allow control of the rotation of the satellite 400 (i.e., roll, pitch, and yaw).

Figures 5A, 5B:
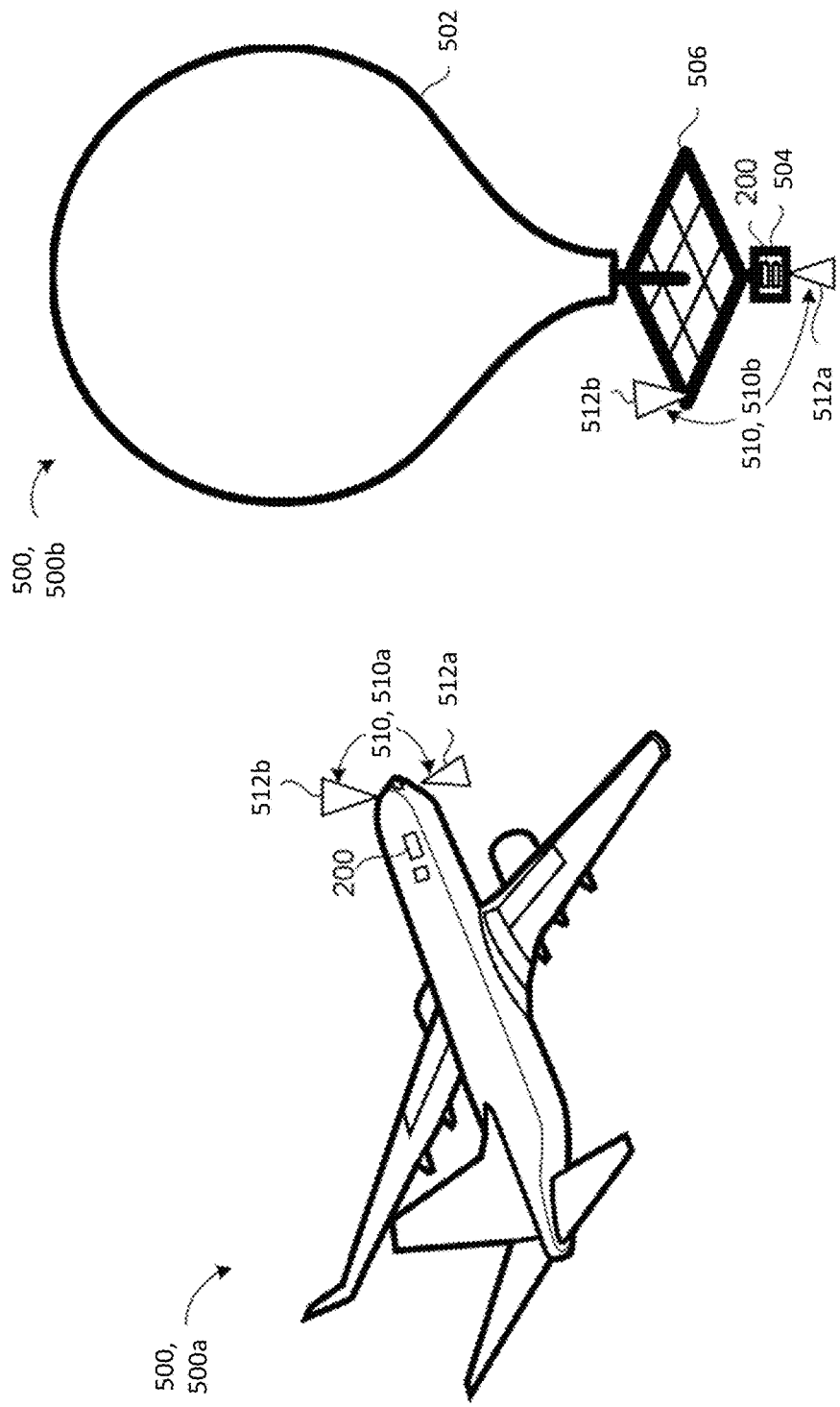
FIGS. 5A and 5B are pictorial diagrams of example high-altitude platforms in accordance with aspects of the disclosure.

Referring to FIGS. 5A and 5B, in some implementations, the HAP 500, e.g., 500a or 500b, may include the communication device 200. The HAP 500 may include an antenna system 510, e.g. 510a or 510b that receives/transmits a communication signal 20. The antenna system 510 may include a first antenna 512a that receives/transmits a communication signal 20 from a ground terminal 300, and/or a second antenna 512b that receives/transmits a communication from a satellite 400 or another HAP. In some examples, the antenna system 510 of the HAP 500 may be configured to track a position of one or more satellites 400 and/or other HAPs to maintain a communication link 22 between the HAP 500 and the satellite 400 and/or other HAPs.

FIG. 5A illustrates an example aircraft 500a, such as, for example, an unmanned aerial vehicle (UAV) or an aircraft without a human pilot onboard. The UAV may be autonomous, remotely piloted, or both. FIG. 5B illustrates an example communication balloon 500b that includes a balloon 502, an equipment box 504, and solar panels 506. The equipment box 504 may also include batteries to store power and the communication device 200 to communicate with other devices (e.g., other HAPs 500, satellites 400, stationary terminals 300). The solar panels 506 may power the equipment box 504.

Communication balloons 500b may be released in to the earth's stratosphere to attain a desired altitude and provide connectivity to a ground area at speeds comparable to terrestrial wireless data services (such as, third generation of wireless mobile telecommunications technology, or 3G, or fourth generation of wireless mobile telecommunications technology, or 4G). The communication balloons 500b may float in the stratosphere, at an altitude higher than airplanes and the weather (e.g., 20 km above the Earth's surface). The communication balloons 500b are carried around the earth by winds and can be steered by rising or descending to an altitude with winds moving in the desired direction. Winds in the stratosphere are usually steady and move slowly at about 5 and 20 mph, and each layer of wind varies in direction and magnitude. In some examples, the one or more processors 210 in the communication device 200 of communication balloon 500b may be configured to execute algorithms to determine where the high-altitude balloon 500b needs to go. The one or more processors 210 may further be configured to move the high-altitude balloon 500b into a layer of wind blowing in a direction that may take the balloon 500b where it should be going.

Example Methods

Misalignment of a first optical system 250a of a first communication device 200a and a second optical system 250b of a second communication device 200b may be detected when the devices are not able to detect light from one another such that the communication devices 200a, 200b are unable to establish a communication link 22 to send and/or receive information. The first communication device 200a and the second communication device 200b may become misaligned for any number of reasons, such as, for example, initial acquisition, change in position, turbulence, location calibration error, etc. The misalignment may be detected at the first communication device 200a, the second communication device 200b or both.

Figure 6:
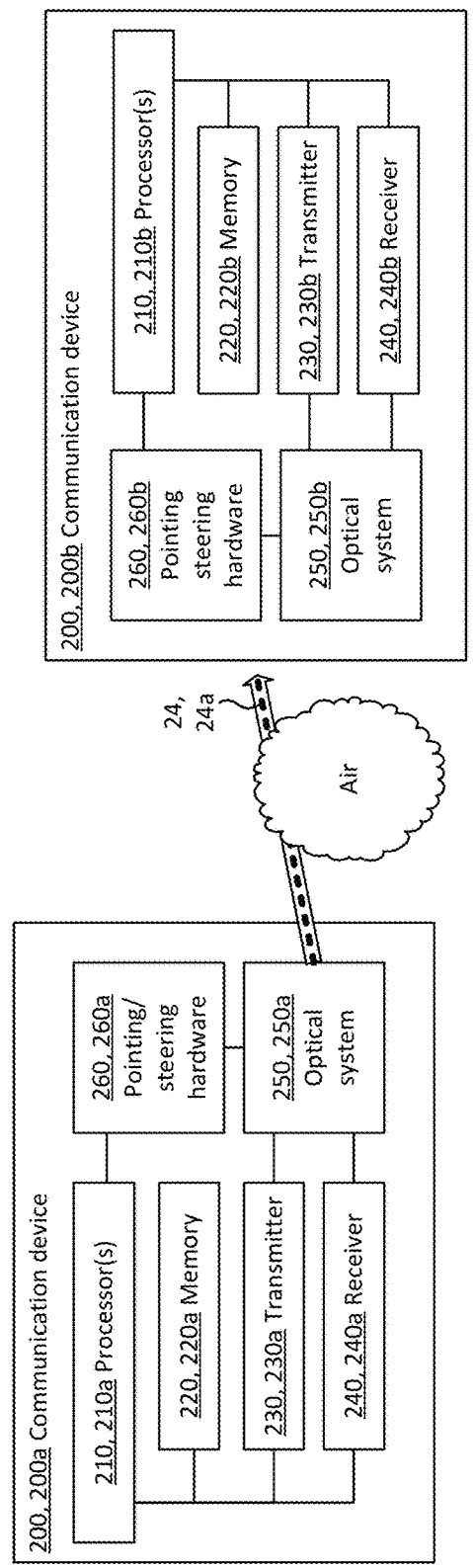
FIG. 6 is a functional diagram of the example communication system of FIG. 2 operating in accordance with aspects of the disclosure.

As shown in FIG. 6, one or more processors 210a of the first communication device 200a may determine that beacon beam 24b transmitted from the second communication device 200b is not properly aligned using receiver 240a. The one or more processors 210a may determine that beacon beam 24b is absent from image frames received at receiver 240a via first optical system 250a. The absence may be detected to be an extended absence that is longer than a threshold length of time and not a brief outage due to turbulence or obstruction. In addition, the one or more processors 210a may also determine that no communications or data 23 has been received at receiver 240a via an optical beam from the second communication device 200b for a threshold length of time. Additionally or alternatively, one or more processors 210b of the second communication device 200b may similarly determine that beacon beam 24a and/or an optical beam being transmitted from the first communication device 200a is not properly aligned using receiver 240b.

When it is determined that the first communication device 200a does not detect the second communication device 200b and/or the second communication device 200b does not detect the first communication device 200a, one of the first communication device 200a and the second communication device 200b may be designated by one or more processors 210 as the primary device, and the other may be designated as the secondary device. The communication device that is better calibrated may be designated as the primary, and the other as the secondary. Identifying the better calibrated communication device may be based on information regarding the first communication device 200a and the second communication device 200b stored at the memory 220a, 220b of the first and second communication devices 200a,

200b. The stored information may be, for example, a time of a last location update, a time of last detection of the other communication device, a level of confidence of being in the same location as the last location update, or a level of confidence of a location of a last received beacon. The better calibrated communication device may therefore be the communication device that has a more recent location update, a more recent detection of the other communication device, a higher level of confidence of being in the same location as the last location update, or a higher level of confidence of the location of the last received beacon. In other examples, the first communication device 200a and the second communication device 200b determine designations using a random generator when there is no stored information that may be used to make the designations. Alternatively, a third communication device that has communication links 22 established with the first and the second communication devices 200a, 200b may obtain information about the first and second communication devices 200a, 200b and send designations to the first and second communication devices 200a, 200b based on the obtained information.

For example, first communication device 200a determines its designation based on the information stored at memory 220a. The information at memory 220a includes the first communication device's level of confidence of the location of the last received beacon from the second communication device 200b and the second communication device's level of confidence of the location of the last received beacon from the first communication device 200a. The first communication device's level of confidence is higher than the second communication device's level of confidence. Therefore, first communication device 220a is designated as the primary device. Second communication device 200b determines its designation based on information stored at memory 220b. The information at memory 220b also includes the first communication device's level of confidence of the location of the last received beacon from the second communication device 200b and the second communication device's level of confidence of the location of the last received beacon from the first communication device 200a. Because the second communication device's level of confidence is lower than that of the first communication device 200a, second communication device 220b is designated as a secondary device.

After the designations are determined, the secondary device initiates a secondary search pattern using the second optical system 250 of the secondary device while the primary device transmits a beacon beam 24. The secondary search pattern is a series of frame positions forming an outward spiral that are ordered in increasing distance from a starting frame position. The one or more processors 210 of the secondary device may determine the starting frame position based on a best estimate of the location of the first optical system of the primary device. In particular, the starting frame position may be where a frame captured by the secondary device may be centered on the best estimated location.

The series of frame positions of the secondary search pattern may be arranged at intervals from the starting frame position in relation to an estimated misalignment, such as, for example, double the estimated misalignment or more or less. For example, the estimated misalignment may be estimated to be 0.30 degrees, and the series of frame positions of the secondary search pattern may be arranged at approximately 0.60 degrees intervals.

Figure 7:
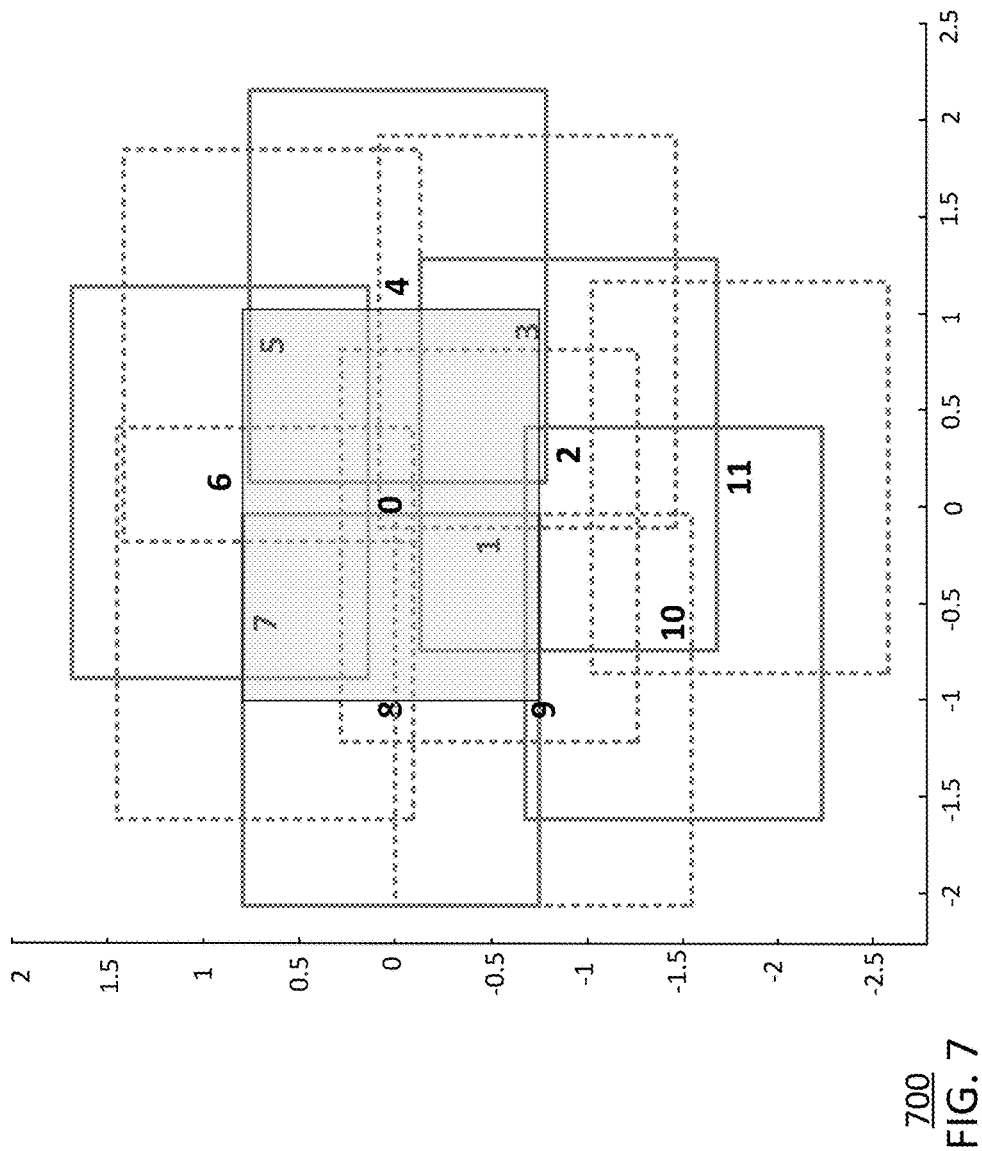
FIG. 7 is a pictorial diagram of an example search pattern in accordance with aspects of the disclosure.

As shown in FIG. 7, the example secondary search pattern 700 includes a starting frame position 0, centered at a best estimate of the location of the first optical system 250a of first communication device 200a. The dimensions of the starting frame position 0 are shown by the shaded rectangle. Next frame positions 1, 2, 3, 4, 5, 6, 7, 8, 9, 10, and 11 are arranged in a spiral outward from starting frame position 0 in the order listed. The identification of each of the frame positions 0-11 is positioned at the center of each frame. Dimensions of the frame positions 1-11 are shown by a rectangular outline. The rectangular outline alternates in being dashed lines and solid lines for easier identification. A shown, the outline for frame position 1 is dashed, the outline for frame position 2 is solid, the outline for frame position 3 is dashed, and so on. Center of next frame position 1 is approximately 0.60 degrees away from center of starting frame position 0. Center of next frame position 2 is approximately 0.60 degrees away from center of frame position 1, and so on. The frame positions of the secondary search pattern 700 are arranged relative to one another, and not relative to the communication device. In this way, the secondary search pattern 700 may represent a pattern drawn on the sky in examples where the second optical system 250 of the secondary device is pointed towards the sky. Therefore, when the secondary device is moving the second optical system 250 in accordance with the secondary search pattern 700, movements of the secondary device may be detected and compensated for in order to determine a direction to point the second optical system 250 to be in a frame position of the secondary search pattern 700.

The second optical system 250 of the secondary device stays in a given frame position in the secondary search pattern 700 for a first set amount of time while the secondary device acquires a set of frames from the given position. The first set amount of time may be based on the frame acquisition rate of the secondary device or the amount of time it takes for the primary device to focus on the beacon beam 24 of the secondary device. For example, the one or more processors 210b of second communication device 200b may be configured to acquire frames at about 5000 frames per second using receiver 240b via second optical system 250b. The one or more processors 210b may further be configured to take 20 frames at a frame position in the secondary search pattern 700. Therefore, the second optical system 250b may be at the starting frame position 0 for the first set amount of time of about 0.004 seconds. The first set amount of time may further be based on a size of the pointing hardware 260b and the available power. Alternatively, the first set amount of time may be at least double the time it takes for first communication device 200a to establish a communication link 22a after detecting the beacon beam 24b of the second communication device 200b.

The one or more processors 210 of the secondary device may determine whether a beacon beam 24 transmitted from the primary device is in the set of acquired frames at the given frame position. Spot centroiding or other known methods of beacon detection may be used by one or more processors 210 of the secondary device to determine whether a beacon beam 24 is in one or more of the frames acquired from the given frame position.

In addition, the one or more processors 210 may also determine a level of confidence that a beacon beam 24 is detected from the given position based on the determination of whether the beacon beam 24 is in the set of acquired frames. The level of confidence may be a percentage that reflects the likelihood that the beacon beam 24 is at the location captured from the given position. For example, 0% may reflect no likelihood, and 100% may reflect absolute certainty. Alternatively, other measurements of confidence may be used.

If the determined level of confidence meets a threshold level of confidence, the one or more processors 210 may maintain the second optical system 250 of the secondary device at the given location. No further rotation to a next frame position in the secondary search pattern 700 is performed, and the secondary device may lock onto the location of the beacon beam 24 and initiate a communication link 22 with the primary device. The threshold level of confidence may be, for example, 50% or more or less. In this case, if the one or more processors 210*b* of the second communication device 200*b* determine that there is a 75% level of confidence that a beacon beam 24 is at the location captured form the starting frame position 0, then the one or more processors 210 may use the receiver 240*b* and second optical system 250*b* to lock onto the location of the beacon beam 24 and initiate a communication link 22.

If the determined level of confidence is less than the threshold level of confidence, the one or more processors 210 of the secondary device may move the second optical system 250 of the secondary device to a next frame position in the secondary search pattern 700 using the pointing hardware 260 and repeat the frame acquisition and beacon detection process described above. For instance, if the one or more processors 210*b* of the second communication device 200*b* determine that there is a 10% level of confidence that a beacon beam 24*a* is at the location captured from the starting frame position 0, then the second optical system 250*b* is moved to position 1 using pointing hardware 260*b*, the next frame position in the secondary search pattern 700.

The one or more processors 210 may be configured to rotate through every frame position in the secondary device until a beacon beam 24 is detected. After the last frame position of the secondary search pattern 700 is reached with no detection of the beacon beam 24 of the primary device, the one or more processors 210 of the secondary device is configured to repeat the secondary search pattern 700.

Meanwhile at the primary device, after the designations are determined as discussed above, the primary device initiates a primary search pattern by moving to a starting beacon position using the pointing hardware 260 of the primary device and staying in the starting beacon position for a second set amount of time. The one or more processors 210 of the primary device may determine the starting beacon position based on a best estimate of the location of the second optical system 250 of the secondary device. In particular, the starting beacon position may be where a beacon beam 24 transmitted by the primary device may be pointed at the best estimated location. For example, first communication device 200*a*, designated as the primary device, may determine a best estimate of where second optical system 250*b* of second communication device 200*b* is using data stored in memory 220*a* and point first optical system 250*a* and beacon beam 24*a* in the direction of the best estimated location of second optical system 250*b* to initiate the primary search pattern.

The primary search pattern may include a series of beacon positions forming concentric circles centered on the starting beacon position of the primary device. The primary search pattern may start from beacon positions in concentric circles having smaller radii to those in circles having larger radii. The radii of the concentric circles may be based on a size of the solid angle in space illuminated by the beacon beam 24. For example, the radii of the concentric circles may be multiples of the radius of the solid angle illuminated by the beacon beam 24.

Figure 8:
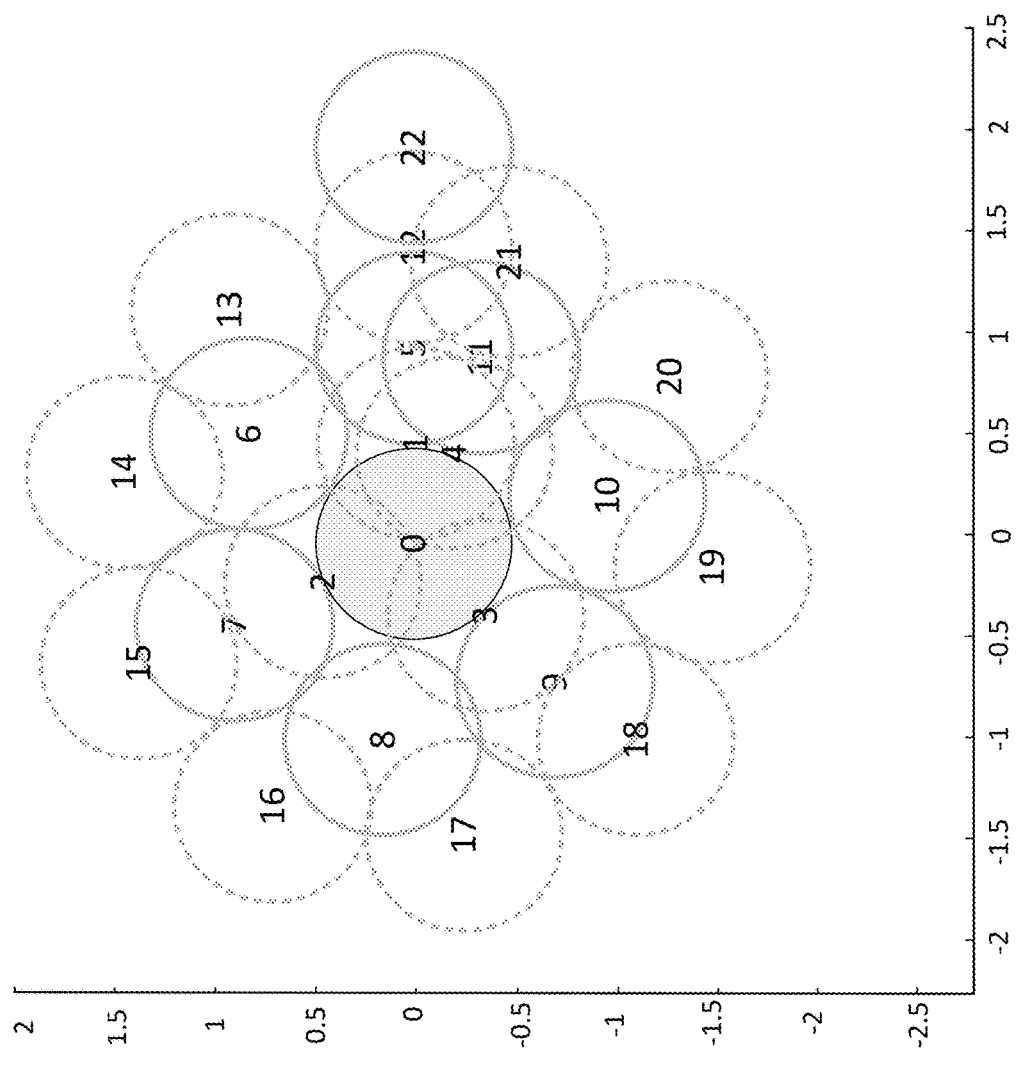
FIG. 8 is a pictorial diagram of another example search pattern in accordance with aspects of the disclosure.

As shown in FIG. 8, the example primary search pattern 800 includes a starting beacon position 0, centered at a best estimate of the location of the second optical system 250*b* of second communication device 200*b*. The dimensions of the starting beacon position 0 are shown by the shaded circle. Next beacon positions 1, 2, 3, 4, 5, 6, 7, 8, 9, 10, 11, 12, 13, 14, 15, 16, 17, 18, 19, 20, 21, and 22 are arranged in concentric circles about the starting beacon position 0. The identification of each of the beacon positions 0-22 is positioned at the center of each beacon position. Dimensions of the frame positions 1-11 are shown by a circular outline. For easier identification, the circular outline alternates in being dashed lines and solid lines based on the concentric circle on which the beacon position is arranged. The solid angle of the beacon beam 24*a* of first communication device 200*a* has a radius of approximately 0.4 degrees. Beacon positions 1, 2, 3, and 4, shown outlined in dashed lines, are centered about 0.4 degrees away from the center of starting beacon position 0; beacon positions 5, 6, 7, 8, 9, 10, and 11, shown outlined in solid lines, are centered about 0.8 degrees away from the center of starting beacon position 0; beacon positions 12, 13, 14, 15, 16, 17, 18, 19, 20, and 21, shown outlined in dashed lines, are centered about 1.2 degrees away from center of starting beacon position 0, and beacon position 22, shown outlined in a solid line, is centered about 1.6 degrees away from center of starting beacon position 0. The beacon positions in each concentric circle are arranged such that the entire circumference of a given concentric circle is covered by the beacon beam 24 after each beacon position in the given concentric circle is used. The beacon positions of the primary search pattern 800 are arranged relative to one another, and not relative to the primary device. In this way, the primary search pattern 800 may represent a pattern drawn on the sky in examples where the first optical system 250 of the primary device is pointed towards the sky. Therefore, when the primary device is moving the first optical system 250 in accordance with the primary search pattern 800, movements of the primary device may be detected and compensated for in order to determine a direction to point the first optical system 250 to be in a beacon position of the primary search pattern 800.

The second set amount of time for which the primary device is held in the starting beacon position may correspond to the amount of time a secondary device may take to rotate through the secondary search pattern 700. For example, the secondary search pattern 700 has 12 total frame positions, and the secondary device is configured to acquire 20 frames at each frame position at 5000 frames per second. Therefore, the second set amount of time may be the amount of time the secondary device needs to rotate through all 12 frame positions, or 0.048 seconds. In this way, the primary device may be still while the secondary device follows the secondary search pattern 700.

If the secondary device establishes a communication link 22 with the primary device during the second set amount of time, the primary device may stay in the starting beacon position. According to the primary search pattern 800, the first optical system 250*a* and beacon beam 24*a* is configured to stay in the beacon position pointing towards the best estimated location of second optical system 250*b* for approximately 0.048 seconds. Second communication device 200*b* detects beacon beam 24*a* transmitted from the first communication device 200*a* within the 0.048 seconds and establishes a communication link 22*a*, as shown in FIG. 2. In this case, first communication device 200*a* does not move first optical system 250*a* according to a search pattern. First communication device 200*a* may track second communication device 200*b* and establish another communication link 22*b* with second communication device 200*b*. In some examples, the primary device may establish a second communication link 22a with the secondary device.

If the second set amount of time passes and no communication link has been established with the secondary device, the one or more processors 210 of the primary device moves the first optical system 250 of the primary device to a next beacon position for the second set amount of time using the pointing hardware 260 of the primary device. After each expiration of the second set amount of time without establishment of communication link 22, the first optical system 250 of the primary device may be moved to a next beacon position in the primary search pattern 800. In this way, for each beacon position of the primary search pattern 800, the secondary device may repeat the secondary search pattern 700 until the secondary device detects the beacon beam 24 from the primary device.

Figure 9:
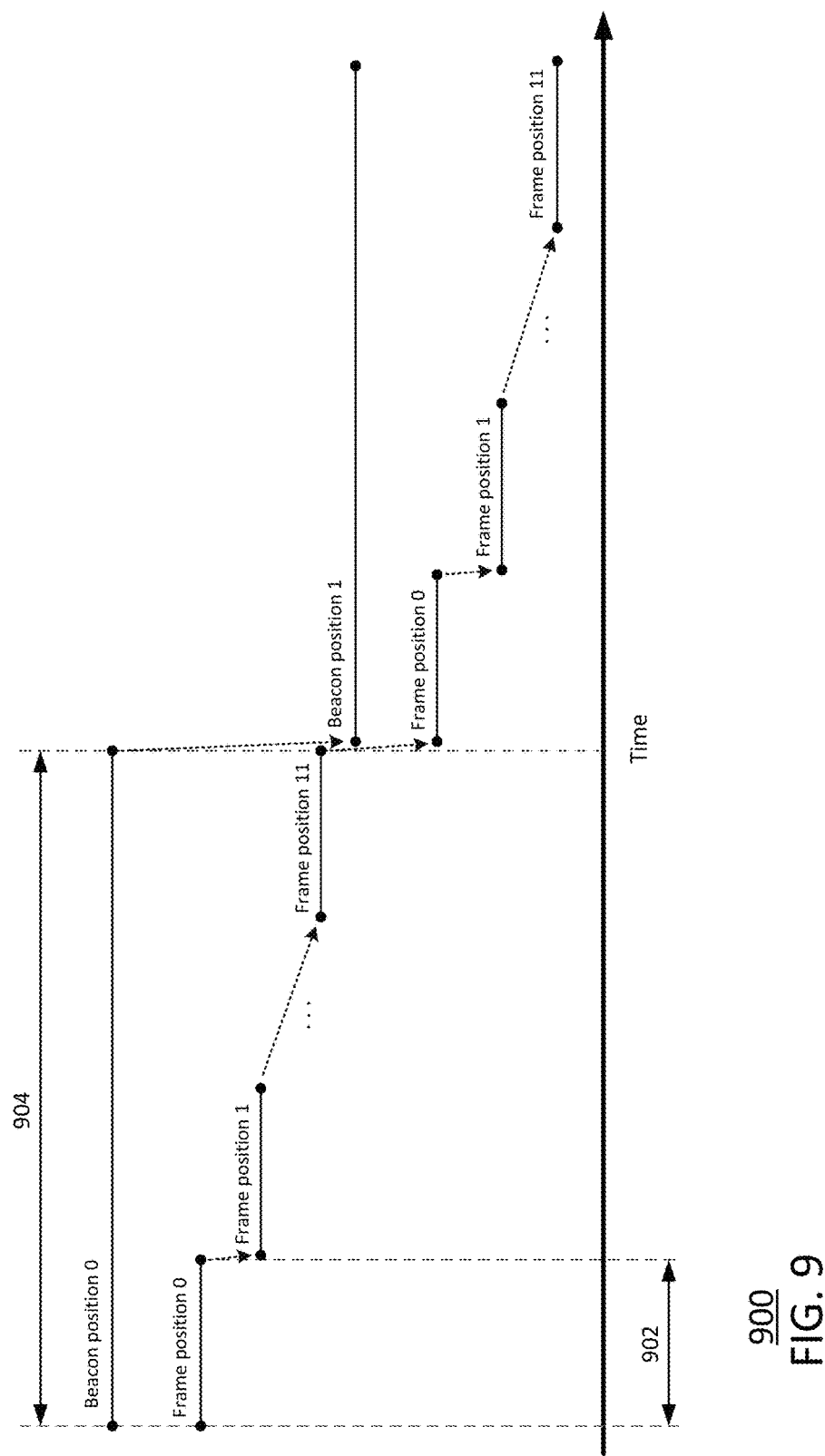
FIG. 9 is a functional diagram of an operation of the example search patterns of FIGS. 7 and 8 in accordance with aspects of the disclosure.

As shown in diagram 900 of FIG. 9, the primary search pattern 800 and the secondary search pattern 700 may be configured to run such that when the primary device is at beacon position 0, the secondary device may complete an entire cycle of the secondary search pattern 700 comprising frame position 0 through frame position 11. According to the secondary search pattern 700, the secondary device is configured to remain at each frame position for first set amount of time 902 of about 0.004 seconds. According to the primary search pattern 800, the primary device is configured to remain at each beacon position for second set amount of time 904 of about 0.048 seconds. After one cycle of the secondary search pattern 700 is completed, the primary and secondary search patterns 700, 800 may then be configured such that the primary device moves to beacon position 1 and the secondary device completes another cycle of the secondary search pattern 700 while the primary device is at beacon position 1. The primary and secondary search patterns 700, 800 may continue according to this configuration until the primary device completes one cycle of the primary search pattern 800 or until a communication link 22 is established between the primary and secondary devices.

When the secondary device detects the beacon beam 24 from the primary device, the secondary device is adjusted to focus on the beacon beam 24 to establish a communication link 22. After the communication link 22 is established, communications and data 23 are transmitted and received between the two communication devices. Using the receiver 240, the one or more processors 210 of the secondary device may digitally crop the frame of the second optical system 250 such that the receiver 240 is focused on a reduced area of the frame. The cropped portion of the frame includes the pixel region where the beacon beam 24 was detected in the frame. The one or more processors 210 of the secondary device may then predict and track any motion of the beacon beam 24 and the primary device to increase signal acquisition robustness. Motion of the beacon beam 24 may be detected using the receiver 240 and the second optical system 250 of the secondary device, or may be predicted based on detected movement of the primary and/or secondary device. Prediction of beacon beam motion may also be based on detected movement of one or both of the first and second optical systems 250 of the primary and secondary devices. When motion of the beacon beam 24 is detected or predicted, cropped portion of the frame may be shifted within the frame in the direction of the beacon beam's detected or predicted motion. Signal acquisition robustness may also be increased by increasing the rate of sampling of the cropped portion of the frame.

In some alternatives, the first and the second communication devices 200a, 200b may determine designations using a second communication channel other than an FSOC link. When the FSOC link between the first and second communication devices 200a, 200b is lost due to misalignment of the first and second communication devices 200a, 200b, a second communication channel existing between the first and second communication devices 200a, 200b may be used to transmit and receive information. For example, the second communication channel may be a satellite uplink, radiofrequency dish links, or between another set of transducers. Upon detection of a misalignment of the first and second communication devices 200a, 200b, the first communication device 200a may request and receive information from the second communication device 200b relevant to determining a designation, and the second communication device 200b may request and receive the same from the first communication device 200a.

If a communication link 22 has not been successfully establish between first and second communication devices 200a, 200b after the primary and secondary search patterns 700, 800 have both been completed, the designations of the first and second communication devices 200a, 200b may be swapped, and another search may be performed using the new designations. For example, first communication device 200a was originally designated as the primary device, and second communication device 200b as the secondary device. Both the primary search pattern 800 and the secondary search pattern 700 are completed when second communication device 200b completes the cycle of secondary search pattern 700 while first communication device 200a is at beacon position 22. When both the primary and secondary search patterns 700, 800 are completed, first communication device 200a may be newly designated as the secondary device, and second communication device 200b may be newly designated as the primary device. Then the first communication device 200a may follow the secondary search pattern 700 and the second device may follow the primary search pattern 800 until a communication link 22 has been established between the two communication devices 200a, 200b. In other examples, the designations may be swapped after the primary and secondary search patterns 700, 800 are both completed a plurality of times, such as, for example, five.

In further examples, if a communication link 22 has been successfully established after the primary and secondary search patterns 700, 800 have been completed, the starting beacon position of the primary search pattern 800 and/or the starting frame position of the secondary search pattern 700 may be shifted. For instance, the starting beacon position may be shifted to a next beacon position or a last beacon position in the primary search pattern 800, and the entire primary search pattern 800 may be shift to center on the new starting beacon position. The secondary search pattern 700 may similarly be shifted. Additionally or alternatively, a frame position may be shifted in a direction of a detected brightness in the acquired frames that reaches a threshold brightness value.

Both the first and second communication devices 200a, 200b may alternatively be designated as secondary devices. Both first and second communication devices 200b may therefore run the secondary search pattern 700 at the same time. The secondary device designation may be assigned to both the first and second communication devices 200a, 200b when the information stored at each memory 220a, 220b indicates that the location of the first communication device 200a, the second communication device 200b, or both is not known to a satisfactory degree.

For example, the time of a last location update may be longer than a first maximum threshold time, a time of last detection of the other communication device may be longer than a second maximum threshold time, a level of confidence of being in the same location as the last location update may be lower than a first minimum threshold level of confidence, or a level of confidence of a location of a last received beacon may be lower than a second minimum threshold level of confidence. The first and second maximum threshold time may be, for example, 5 minutes and 10 minutes, respectively, or may both be the same amount of time, such as, for example, 5 minutes. The first and second minimum threshold level of confidence may be, for example, 20% and 10%, respectively, or may both be the same percentage, such as, for example, 10%. The secondary device designation may also be assigned to both the first and second communication device 200a, 200b when the primary and secondary search patterns 700, 800 have been completed without establishing a communication link 22 or when primary and secondary search patterns 700, 800 have been completed after swapping designations without establishing a communication link 22.

Figure 10:
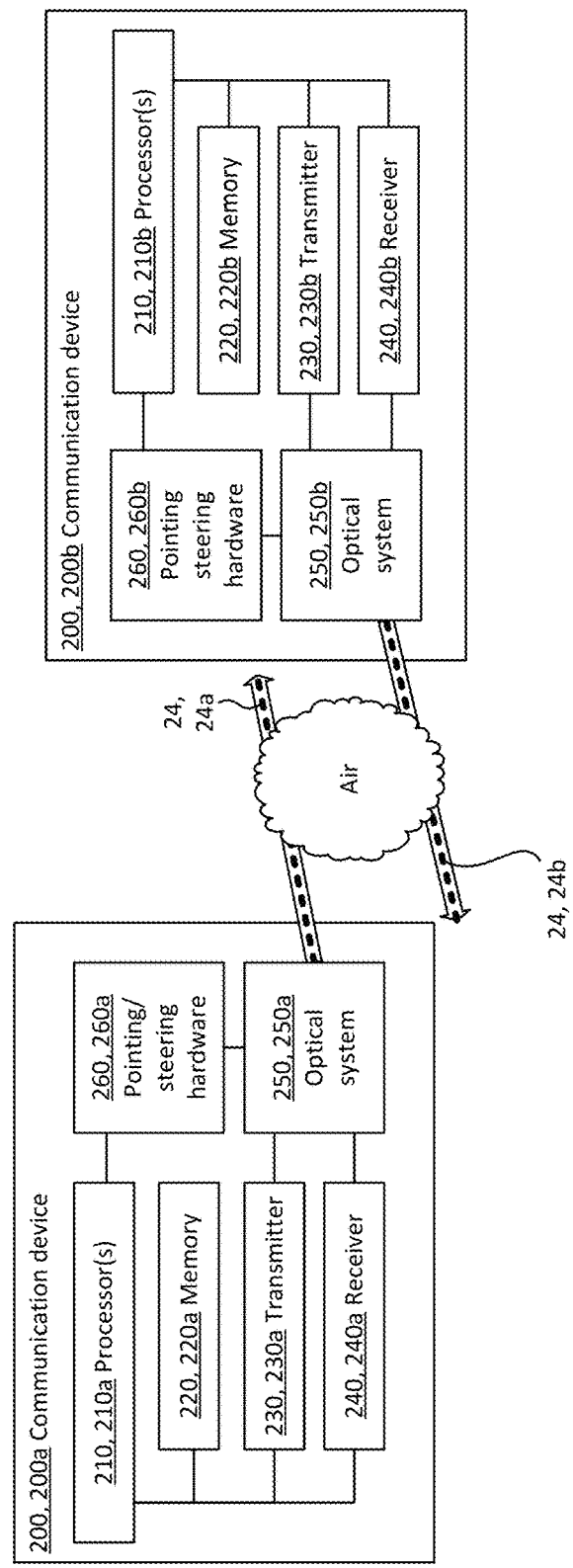
FIG. 10 is functional diagram of the example communication system in FIG. 2 operating in accordance with other aspects of the disclosure.

As shown in FIG. 10, the secondary device may also transmit a beacon beam 24 while performing the secondary search pattern 700, such that the primary device may establish a communication link with the secondary device when beacon beam 24 from the secondary device is detected. The second communication device 200b transmits beacon beam 24b while the first communication device 200a transmits beacon beam 24a. In the same way as described above for the secondary device, the primary device may also acquire frames via the receiver 240 and the first optical system 250 of the primary device while primary device is at each beacon beam location and detect, using the one or more processors 210 of the primary device, a beacon beam 24 of the secondary device in one or more of the acquired frames.

For example, while the first communication device 200a is at beacon position 0, a plurality of frames may be acquired at the first communication device 200a at the rate of 5000 frames per second. As the secondary device rotates through the frame positions of the secondary search pattern 700, the beacon beam position of the beacon beam 24 transmitted from the secondary device may also rotate with the frame positions, centered at the same location as the frame positions. When the one or more processors 210 of the primary device detects the beacon beam 24 of the secondary device, no further rotation according to the primary and secondary search patterns 700, 800 are performed, and the primary device may establish a communication link 22 with the secondary device. The primary device may also track the beacon beam location as described above with respect to the secondary device.

When the one or more processors 210 tracking a beacon beam 24 in the cropped portion of the frame temporarily loses the beacon beam 24, the one or more processors 210 may enlarge the cropped portion of the frame using the receiver 240 to encompass a larger pixel region until the beacon is detected. Then the cropped portion of the frame may be reduced, and tracking performed as previously described. When the cropped portion of the frame is enlarged more than a maximum threshold size, the first and second communication devices 200a, 200b may be designated as primary and secondary devices, and the primary and secondary search pattern 700, 800 may be initiated from where the beacon beams 24a, 24b were last detected.

Figure 11:
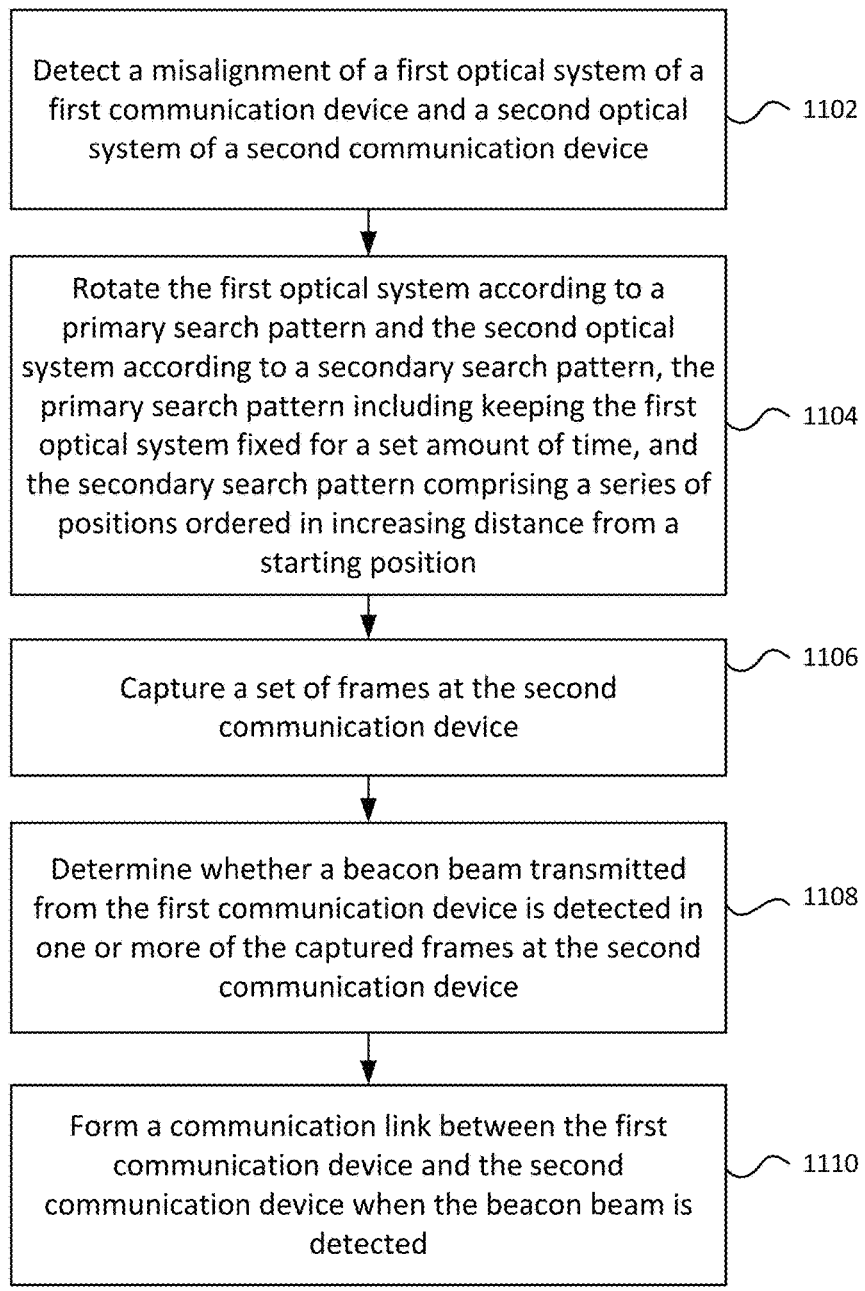
FIG. 11 an example flow diagram in accordance with aspects of the disclosure.

In FIG. 11, a flow diagram 1100 is shown in accordance with some of the aspects described above that may be performed by one or more processors 210 of communication device 200. While FIG. 11 shows blocks in a particular order, the order may be varied and that multiple operations may be performed simultaneously. Also, operations may be added or omitted.

At block 1102, misalignment of a first optical system 250a of a first communication device 200a and a second optical system 250b of a second communication device 200b is detected. At block 1104, the first optical system 250a is rotated according to a primary search pattern 800, and the second optical system 250b is rotated according to a secondary search pattern 700. The primary search pattern 800 includes maintaining the first optical system 250a in a fixed position for a set amount of time. The secondary search pattern 700 includes a series of positions ordered in increasing distance from a starting position. A set of frames is captured at the second communication device 200b at block 1106. At block 1108, whether a beacon beam 24a transmitted from the first communication device 200a is detected in one or more of the captured frames is determined at the second communication device 200b. Then, a communication link 22b is formed between the first communication device 200a and the second communication device 200b when the beacon beam 24a is detected at block 1110.

The features described above may provide for an efficient way to detect a beacon beam location and establish a long distance optical communication link between two communication devices. A communication network created using the features described may provide end users with network coverage that is robust to outages because beacon beams may be detected quickly and the optical systems may quickly adjust for any system movements. Because of this, end users of the communication network are more likely to use the network because it may provide more reliable coverage and may also be accessible in remote areas when mounted to HAPs.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   detecting, by one or more processors, a misalignment between a first optical system of a first communication device and a second optical system of a second communication device;
   rotating, by the one or more processors, the first optical system according to a primary search pattern and the second optical system according to a secondary search pattern, the primary search pattern including keeping the first optical system fixed for a set amount of time, and the secondary search pattern comprising a series of positions ordered in increasing distance from a starting position;

capturing, by the one or more processors, a set of frames for each of the series of positions at the second communication device;

determining, by the one or more processors, whether a beacon beam transmitted from the first communication device is detected in one or more of the captured frames at the second communication device; and forming, by the one or more processors, a communication link between the first communication device and the second communication device when the beacon beam is detected.

2. The method of claim 1, wherein the set amount of time that the first optical system is fixed is a length of time that the secondary search pattern takes to complete one cycle.

3. The method of claim 1, wherein the primary search pattern is a series of positions forming concentric circles centered on a starting beacon position of the primary device.

4. The method of claim 1, further comprising designating, by the one or more processors, the first communication device as a primary device associated with the primary search pattern and the second communication device as a secondary device associated with the secondary search pattern.

5. The method of claim 4, further comprising:

swapping, by the one or more processors, the designations of the first communication device and the second communication device when the beacon beam is not detected after the primary search pattern and the secondary search pattern are both completed; and rotating, by the one or more processors, the first optical system according to the secondary search pattern and the second optical system according to the primary search pattern.

6. The method of claim 4, further comprising:

designating, by the one or more processors, the first communication device and the second communication device both as secondary devices when the beacon beam is not detected after the primary search pattern and the secondary search pattern are both completed; and rotating, by the one or more processors, the first optical system and the second optical system according to the secondary search pattern.

7. The method of claim 1, wherein determining whether the beacon beam transmitted from the first communication device is detected in the one or more of the captured frames at the second communication device includes:

determining a level of confidence that the beacon beam is detected, determining whether the level of confidence exceed a threshold level of confidence, determining that the beacon beam is detected when the level of confidence meets the threshold level of confidence, and determining that the beacon beam is not detected when the level of confidence is less than the threshold level of confidence.

8. The method of claim 1, further comprising digitally cropping, by the one or more processors, a frame of the second communication device after the beacon beam is detected, the digitally cropped frame including a pixel region where the beacon beam is detected in the frame.

9. The method of claim 8, further comprising:

determining, by the one or more processors, that the communication link is lost;

continually enlarging, by the one or more processors, the digitally cropped frame to include a larger pixel region until the beacon beam is detected in the digitally cropped frame; and reforming, by the one or more processors, the communication link.

10. The method of claim 9, further comprising initiating, by the one or more processors, the primary search pattern and the secondary search pattern when the digitally cropped frame is enlarged greater than a maximum threshold size.

11. A system comprising:

a first communication device comprising a first optical system;

a second communication device comprising a second optical system; and one or more processors configured to:

detect a misalignment between the first optical system and the second optical system;

rotate the first optical system according to a primary search pattern and the second optical system according to a secondary search pattern, the primary search pattern including keeping the first optical system fixed for a set amount of time, and the secondary search pattern comprising a series of positions ordered in increasing distance from a starting position;

capture a set of frames for each of the series of positions at the second communication device;

determine whether a beacon beam transmitted from the first communication device is detected in one or more of the captured frames at the second communication device; and form a communication link between the first communication device and the second communication device when the beacon beam is detected.

12. The system of claim 11, wherein the set amount of time that the first optical system is fixed is a length of time that the secondary search pattern takes to complete one cycle.

13. The system of claim 11, wherein the primary search pattern is a series of positions forming concentric circles centered on a starting beacon position of the primary device.

14. The system of claim 11, wherein the one or more processors are further configured to designate the first communication device as a primary device associated with the primary search pattern and the second communication device as a secondary device associated with the secondary search pattern.

15. The system of claim 14, wherein the one or more processors are further configured to:

swap the designations of the first communication device and the second communication device when the beacon beam is not detected after the primary search pattern and the secondary search pattern are both completed; and rotate the first optical system according to the secondary search pattern and the second optical system according to the primary search pattern.

16. The system of claim 14, wherein the one or more processors are further configured to:

designate the first communication device and the second communication device both as secondary devices when the beacon beam is not detected after the primary search pattern and the secondary search pattern are both completed; and rotate the first optical system and the second optical system according to the secondary search pattern.

17. The system of claim 11, wherein determining whether the beacon beam transmitted from the first communication device is detected in the one or more of the captured frames at the second communication device includes:
- determining a level of confidence that the beacon beam is detected,
- determining whether the level of confidence exceed a threshold level of confidence,
- determining that the beacon beam is detected when the level of confidence meets the threshold level of confidence, and
- determining that the beacon beam is not detected when the level of confidence is less than the threshold level of confidence.

18. The system of claim 11, wherein the one or more processors are further configured to:
- digitally crop a frame of the second communication device after the beacon beam is detected, the digitally cropped frame including a pixel region where the beacon beam is detected in the frame;
- determine that the communication link is lost;
- continually enlarge the digitally cropped frame to include a larger pixel region until the beacon beam is detected in the digitally cropped frame; and
- reform the communication link.

19. The system of claim 18, wherein the one or more processors are further configured to initiate the primary search pattern and the secondary search pattern when the digitally cropped frame is enlarged greater than a maximum threshold size.

20. A non-transitory, tangible computer-readable storage medium on which computer readable instructions of a program are stored, the instructions, when executed by one or more computing devices, cause the one or more computing devices to perform a method, the method comprising:
- detecting a misalignment between a first optical system of a first communication device and a second optical system of a second communication device;
- rotating the first optical system according to a primary search pattern and the second optical system according to a secondary search pattern, the primary search pattern including keeping the first optical system fixed for a set amount of time, and the secondary search pattern comprising a series of positions ordered in increasing distance from a starting position;
- capturing a set of frames for each of the series of positions at the second communication device;
- determining whether a beacon beam transmitted from the first communication device is detected in one or more of the captured frames at the second communication device; and
- forming a communication link between the first communication device and the second communication device when the beacon beam is detected.

* * * * *